Figure 1:
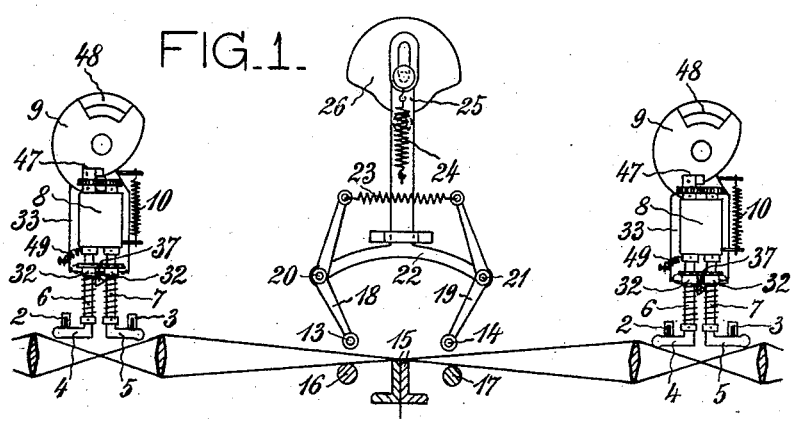

No. 880,215. PATENTED FEB. 25, 1908.
G. HILLER.
DEVICE FOR SEPARATING THE ENDS OF WARP THREADS IN WARP TWISTING MACHINES.
APPLICATION FILED NOV. 2, 1906.

6 SHEETS—SHEET 1.

WITNESSES
W. P. Burke
H. H. Siericks

INVENTOR
Gustav Hiller
By Richards
ATTYS

No. 880,215.  
G. HILLER.  
DEVICE FOR SEPARATING THE ENDS OF WARP THREADS IN WARP TWISTING MACHINES.  
APPLICATION FILED NOV. 2, 1906.
PATENTED FEB. 25, 1908.
6 SHEETS—SHEET 2.
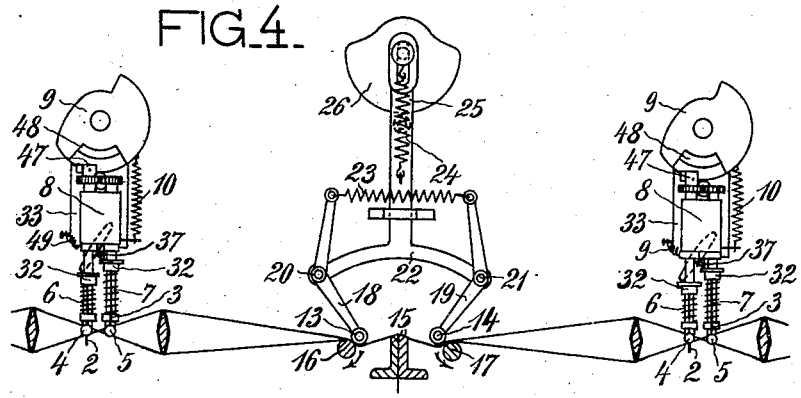
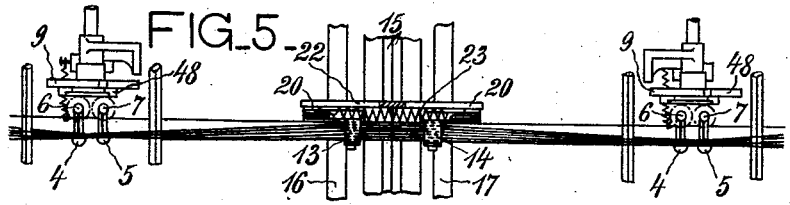
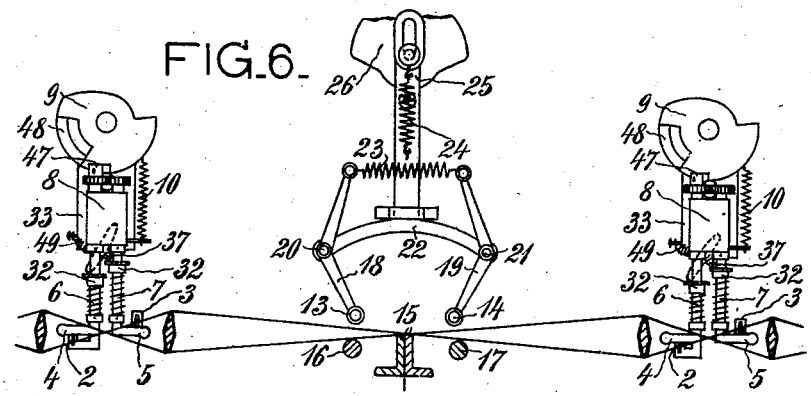
WITNESSES  
W. P. Burke  
H. W. Sieuchs
INVENTOR  
Gustav Hiller  
BY Richardson  
ATTYS No. 880,215. PATENTED FEB. 25, 1908.
G. HILLER.
DEVICE FOR SEPARATING THE ENDS OF WARP THREADS IN WARP TWISTING MACHINES.
APPLICATION FILED NOV. 2, 1906.
6 SHEETS—SHEET 3.
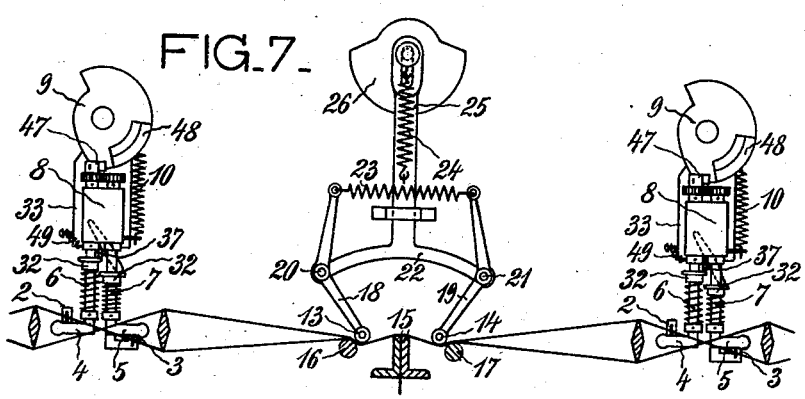
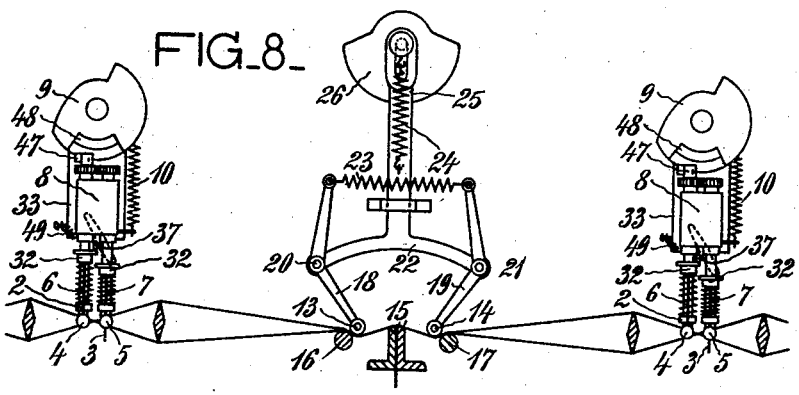
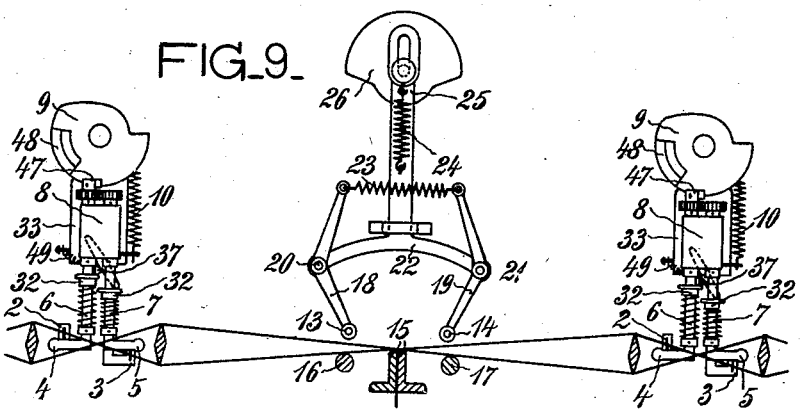
WITNESSES
W. P. Burk
H. H. Siericho
INVENTOR
Gustav Hiller
By Richard ATTYS No. 880,215. PATENTED FEB. 25, 1908.
G. HILLER.
DEVICE FOR SEPARATING THE ENDS OF WARP THREADS IN WARP TWISTING MACHINES.
APPLICATION FILED NOV. 2, 1906.

6 SHEETS—SHEET 4.

WITNESSES
W. P. Burke
H. H. Sierichs

INVENTOR
Gustav Hiller
By Richardson
ATTYS.

No. 880,215. PATENTED FEB. 25, 1908.
G. HILLER.
DEVICE FOR SEPARATING THE ENDS OF WARP THREADS IN WARP TWISTING MACHINES.
APPLICATION FILED NOV. 2, 1906.
6 SHEETS—SHEET 5.
FIG. 12.
FIG. 13.
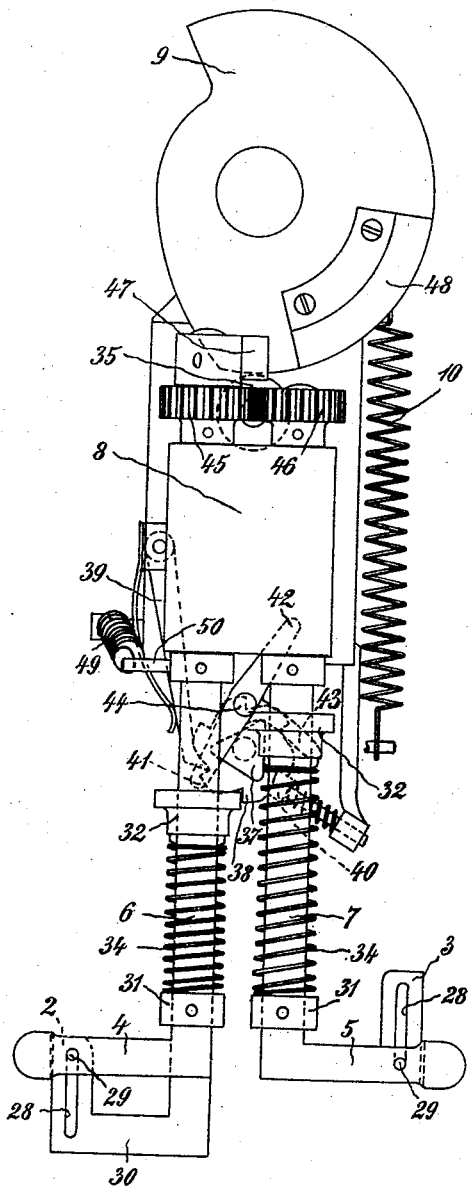
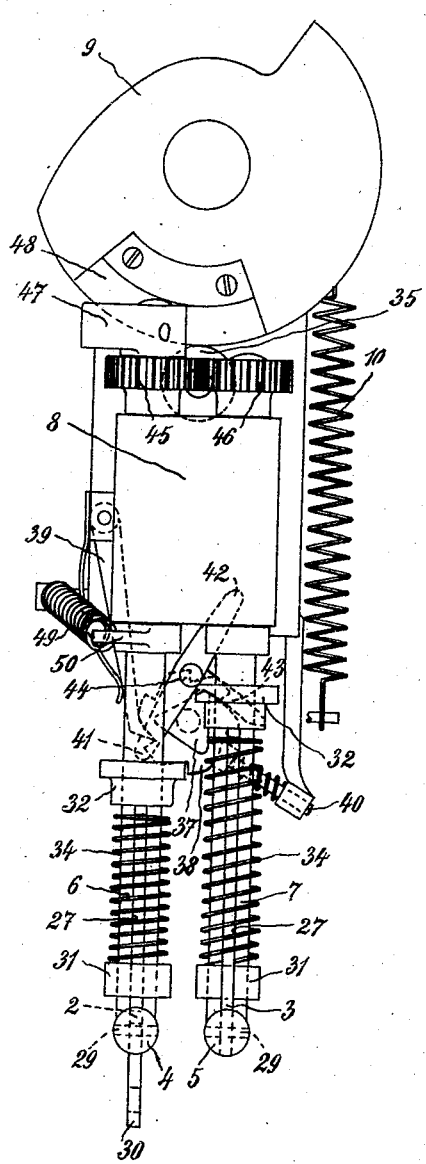
WITNESSES
W. P. Burke
H. W. Sierichs
INVENTOR
Gustav Hiller
By Richards
ATT'YS No. 880,215. PATENTED FEB. 25, 1908.
G. HILLER.
DEVICE FOR SEPARATING THE ENDS OF WARP THREADS IN WARP TWISTING MACHINES.
APPLICATION FILED NOV. 2, 1906.

6 SHEETS—SHEET 6.

WITNESSES
W. P. Burke
H. W. Lurich

INVENTOR
Gustav Hiller
BY Richardson
ATTYS

UNITED STATES PATENT OFFICE.

GUSTAV HILLER, OF ZITTAU, GERMANY.

DEVICE FOR SEPARATING THE ENDS OF WARP-THREADS IN WARP-TWISTING MACHINES.

No. 880,215.　　　　　Specification of Letters Patent.　　　　　Patented Feb. 25, 1908.

Application filed November 2, 1906. Serial No. 341,731.

*To all whom it may concern:*

Be it known that I, GUSTAV HILLER, a subject of the King of Saxony, residing at 1 Ottokarplatz, Zittau, in the Kingdom of Saxony and Empire of Germany, have invented new and useful Improvements in Devices for Separating the Ends of Warp-Threads in Warp-Twisting Machines, of which the following is a specification.

My invention relates to warp twisting devices, in which the ends of the threads of the old and new warp are placed together in a clamp, from which the two ends of the threads to be connected must afterwards be removed and passed to the twisting tool by which the ends of the threads are twisted together.

In the removal of the two ends of the threads to be twisted together each time, that is to say, one end of the new warp and one end of the old warp, it is of the utmost importance that the means designed for conducting the two ends of the threads to the twisting tool shall surely take hold of the proper two ends of the threads, and shall not be able to reach the other or unfinished lease and cause the entanglement of the same. For this purpose leases are formed by the ends of the two warp threads on the two sides of the clamp, these leases enabling the thread which at the moment lies foremost to be removed, because it is passed over one lease rod above, and over the other lease rod below, or vice versa. By this arrangement of the ends of the warp threads in leases it is possible to lay bare the thread which is foremost at the moment by pushing back all the other threads (the unfinished lease) through the intervention of pushers which act upon such ends of the threads as cross the ends to be removed and immediately follow them in the series. In this manner the foremost ends of the threads of the old and new warp have already been laid bare. The devices heretofore employed for this purpose were however inadequate. They consisted substantially of pairs of pushers which, according to the crossing of the threads, acted alternately above and below in the lease and had therefore an upward and downward movement imparted to them, a forwardly swinging movement being moreover communicated to them in each operative position above and below in the lease, in order to force back the unfinished lease seized by them and to lay bare the two ends of the threads to be twisted together, so that the means designed for seizing these ends and to conduct them to the twisting tool could pass freely between the unfinished lease and the ends of the threads to be removed. In the case of the devices hitherto known the pairs of pushers, however, acted only in immediate proximity to the lease rods. In consequence of this the ends of the threads to be laid bare were often not sufficiently laid bare just in the middle where they were to be seized. This was particularly the case when the unfinished lease, in consequence of the alternate tretching and relaxing during the forcing back repeated with every single twister, had become loose and the threads were lying loosely side by side. It then often happened that one of the following threads lay over or adhered to the thread to be removed.

According to my said invention I effect a sure and complete separation of the ends of the threads to be joined without the employment of separators arranged to move in the longitudinal direction, this being accomplished by introducing the pairs of pushers into the outer part of the lease, and moving them during the pushing toward the middle of the lease, where they remain until the ends of the threads to be joined, which are laid bare by the displacement of the unfinished lease, have been removed by the well-known means and conveyed to the twisting tool.

In the accompanying drawings I have represented by way of example a constructional form of the invention, the pushers being provided on pairs of arms which in the position of rest are parallel to the warp threads, the said arms in the displacement of the unfinished lease being swung in the horizontal plane, about pivots situated in proximity to the middle of the lease, in opposite directions until they are perpendicular to the warp.

Figure 2:
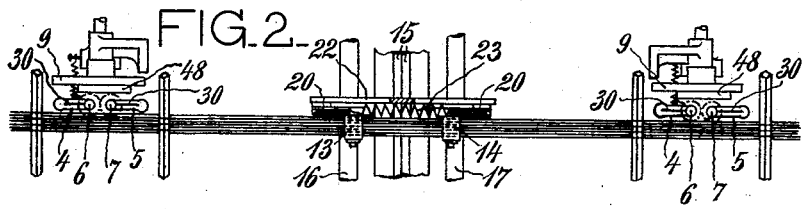
Figure 3:
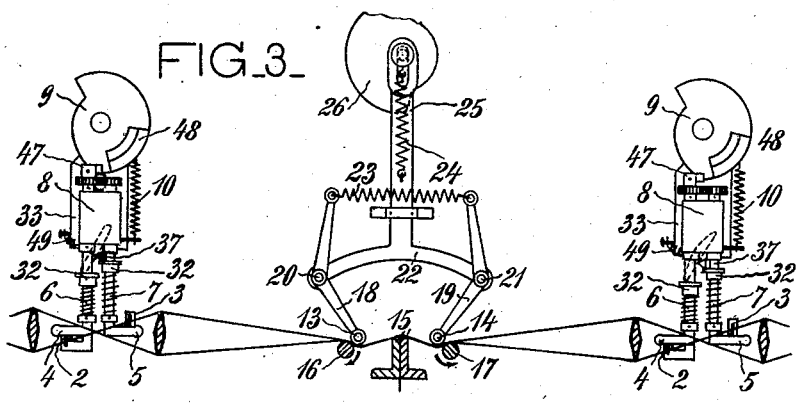
Figure 10:
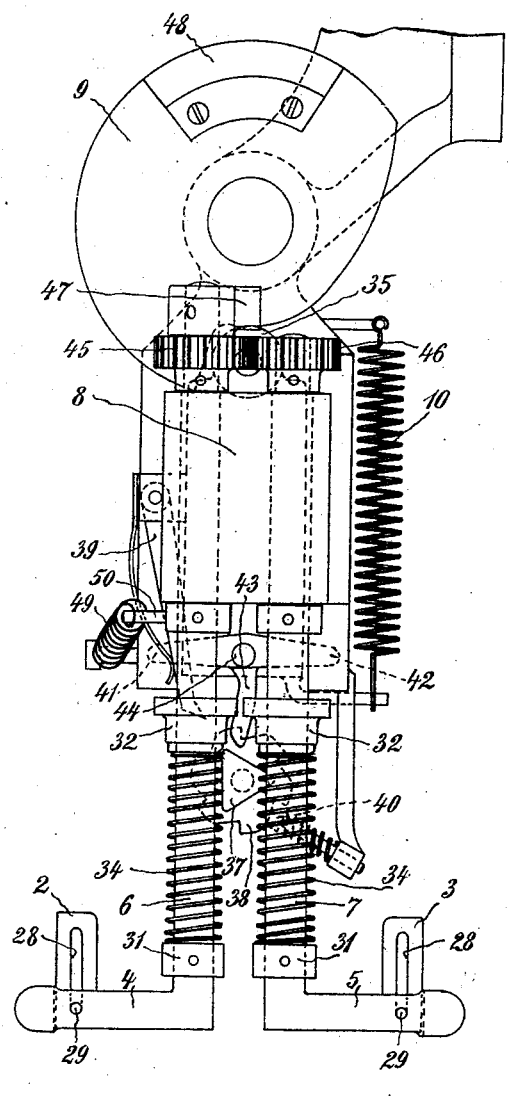
Figure 11:
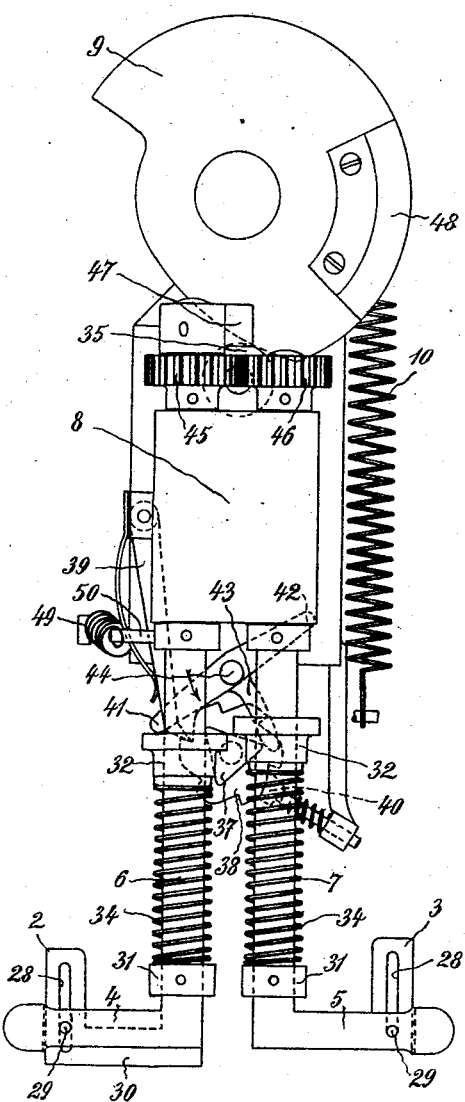
Figure 14:
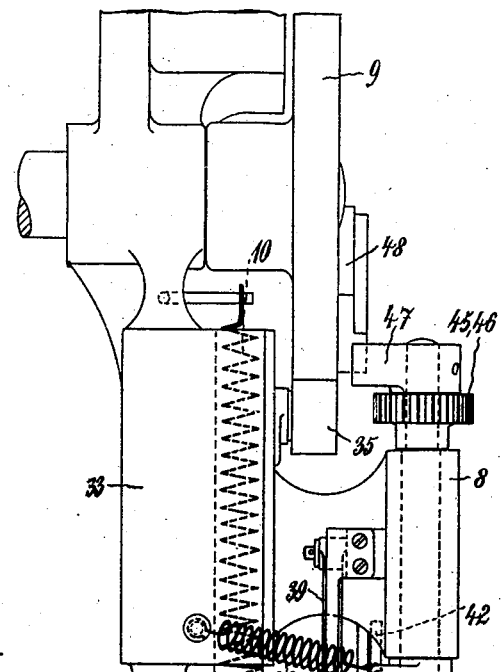
Figure 15:
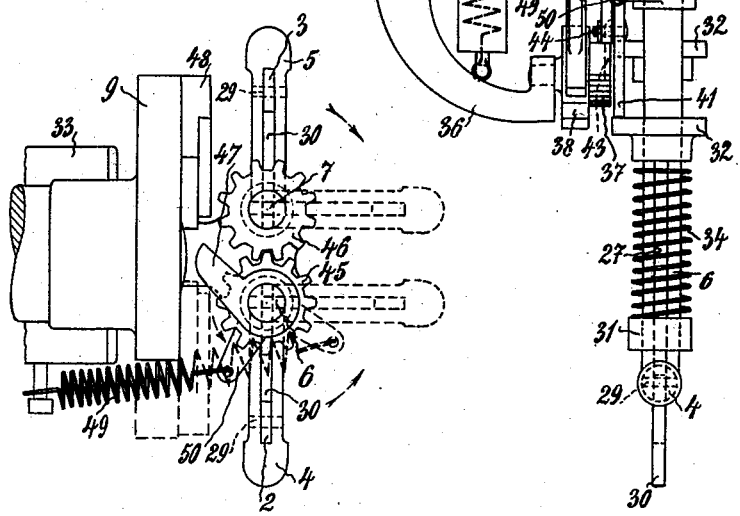

Figure 1 is a diagram showing the device in the position of rest. Fig. 2 is a partial plan corresponding to Fig. 1. Fig. 3 is a diagram showing one pusher in its lowest position. Fig. 4 is a diagram showing one pusher in its lowest position, and both pushers turned upon their spindles. Fig. 5 is a plan corresponding to Fig. 4. Fig. 6 represents the pushers turned back, one of them occupying its lowest position. Fig. 7 represents the pushers turned back, the second pusher occupying its lowest position. Fig. 8 shows the pushers as in Fig. 7, both being turned upon their spindles. Fig. 9 shows the pushers turned back to the position shown in Fig. 7. Fig. 10 is a front elevation on an enlarged scale, in which the pushing device occupies the position of rest. Fig. 11 is a similar view indicating the beginning of the downward movement of one pusher. Fig. 12 is a similar view showing one of the pushers in its lowest position. Fig. 13 is a similar view to Fig. 12, showing both pushers turned forward. Fig. 14 is a side elevation corresponding to Fig. 13. Fig. 15 is a top view corresponding to Fig. 14.

The pushers 2, 3 operating alternately above and below in the lease are constituted by bars adapted to move vertically up and down in horizontal arms 4, 5 of spindles 6, 7. These pushers 2 and 3 are guided in corresponding axial slits 27, Fig. 13, in the spindles 6, 7 and their arms 4, 5, these arms being closed up only at their front ends which re preferably made semispherical. The pushers 2, 3 have longitudinal guide slits 28, Fig. 10, through which pins 29 extend, these pins being fixed in the arms 4, 5.

In the constructional form shown, the pushers 2, 3 constitute the short shanks of U-shaped bars 30, the bridge-pieces of which pass through the arms 4, 5, while the other longer shanks are guided in the slits 27 of the spindles 6, 7. These shanks are prevented from leaving the guide slits in the spindles by a locking ring 31 fixed to each of the spindles 6, 7, and by a locking ring 32 arranged to be displaced longitudinally upon each of the spindles and firmly connected with the long shanks of the U-shaped bar 30. The movement of the locking rings 32, and consequently of the pushers 2, 3, is limited by the pins 29 and the slits 28. Between the locking rings I arrange springs 34 continually tending to force the locking rings 32 and with them the pushers 2, 3 to their highest position, that is to say to the position of rest, Figs. 1, 2 and 10. In the position of rest the pairs of pushers, as is well known, are above the lease, so that they will not in any way prevent the transverse movement of the threads, Figs. 1 and 10; whereas in the operative movement the arms 4 must swing in the horizontal central plane of the warp, in order that the displacement may take place uniformly. For moving the pairs of pushers from the position of rest to the operative position, and vice versa, the spindles 6, 7 are arranged in a slide 8 so that they cannot be displaced in the axial direction, the said slide being guided vertically in a prismatic guide 33. A draw spring 10 continually tends to pull the slide 8 to its highest position. The downward movement of the slide 8 is effected in opposition to the spring 10 by an eccentric 9 acting upon a roll 35 pivoted to the slide 8, the said eccentric being made of circular shape over somewhat more than half its circumference, so that the pairs of pushers will remain in their operative position during approximately half the time of the rotation of the eccentric 9.

In order that the pushers 2, 3 of a pair may be reversed each time for the alternate action above and below in the lease, I provide a device, the construction and action of which are clearly shown in Figs. 10 to 15. This device comprises a switch 37 pivoted at right angles to the spindles 6, 7 and between them to the prismatic guide 33 or to an arm 36 of the same, the said switch having a triangular section and being firmly connected with a ratchet wheel 38. By means of a spring-actuated pawl 39 secured to the slide 8 the ratchet wheel is turned one tooth in every downward movement of the slide, and is furnished with a spring-actuated counter pawl 40. The switch 37 serves for switching a three-armed reversing lever 41, 42, 43 adapted to turn upon a pivot 44 arranged on the slide 8 and placed parallel to the axis of the switch 37. The arm 41 of the reversing lever acts upon the locking ring 32 of the pusher 2, and the arm 42 upon the locking ring 32 of the pusher 3, while the downwardly extending arm 43 is acted upon by the switch during the downward movement of the slide.

The axis of the pivot 44 for the reversing lever and the axis of the switch 37 are placed vertically one above the other, and the reversing lever is so balanced that its downwardly extending arm 43, when occupying its position of rest, Fig. 10, is vertically above the axis of the switch. This switch is turned each time by the ratchet wheel through an angle of 60°; and is so adjusted that one of its sides, either right or left, will be placed vertical.

In the downward movement of the slide 8 by the eccentric 9 the arm 43 of the reversing lever strikes against the oblique surface of the switch 37, which is turned toward it and on which it slides along in order to impart to the reversing levers 41, 42 the corresponding turning movement, for instance in the direction of the arrow shown in Fig. 11. Shortly afterwards the pawl 39 engages with the ratchet wheel 38, causing the same to move through one-sixth of a turn, in which the switch 37 takes part. In this case the switch 37, whose corresponding edge acts as a cam, moves the arm 43 of the reversing lever to its operative position, Figs. 12, 13; in the arrangement represented in Figs. 10 to 15, it has then for instance placed the pusher 2 in its lowest position. The reversing lever remains in the operative position until the slide 8, by the action of the spring 10, is moved upwards again after being released by the eccentric 9. This movement of the slide takes place suddenly, as the offset of the eccentric 9 from its largest to its smallest diameter forms a radial line. Having in this manner passed to their operative position, Fig. 3, one of the pushers 2, 3 is now above, and the other below in the lease, that is to say in the outer part of the same. It is now necessary for the pushers in their operative movement to swing towards the center of the lease. For this purpose the spindles 6 and 7, have each a quarter of a turn imparted to them in opposite directions. To this end spur wheels 45 and 46 are arranged at the upper end of each spindle, these spur wheels, which are of the same size, being continuously in engagement. The wheel 45 is moreover firmly connected with a cam 47 extending into the path of a tappet 48 on the eccentric 9. By a draw spring 49 the arms 4, 5 of the pushers 2, 3 are continually pulled to the position parallel to the warp threads, the said spring being on the one hand fixed to the guide 33, and on the other hand engaging an arm 50 fixed up in the spindle 6.

As soon as the slide 8 has passed together with the pushers 2, 3 to the lowest or operative position, Fig. 12, the tappet 48 in the continued turning movement of the eccentric 9 acts upon the cam 47, thereby imparting to the spindle 6 a turning movement in the direction of the arrow shown in Fig. 15, and to the spindle 7 a turning movement in the opposite direction, through an angle of about 90° each (see Fig. 13: Fig. 15, position indicated in dotted lines, and Figs. 4 and 5). As soon as the cam 47 leaves the tappet 48 of the eccentric 9 the two spindles 6 and 7, owing to the action of the spring 49, will return to their position parallel to the warp threads, Fig. 6. When the slide 8, on being released by the eccentric 9, is caused by the action of the spring 10 to move upwards again to its position of rest, the arm 43 will be released from the switch and the spring 34 can move the pusher 2 together with the reversing lever back to the position of rest, Fig. 10 and Figs. 1 and 2.

In the next operative movement the pusher 3 is moved to its lowest position exactly in the same manner as above set forth, while the pusher 2 remains in its position. The reversing lever, through the intervention of the switch, has then a turning movement imparted to it in the opposite direction, and acts by its arm 42 upon the locking ring 32 of the pusher 3, Fig. 7. After passing to their operative position the spindles 6, 7 have a turning movement communicated to them in the opposite direction by the tappets 48 on the eccentric 9, so that the pushers will be swung to the center of the lease and be placed perpendicular to the warp threads in their central plane, Fig. 8. When the tappet 48 on the eccentric 9 leaves the cam 47, the spindles 6, 7 are turned back by the springs 49 to their position parallel to the warp threads Fig. 9, and in the final upward movement of the slide 8 by the draw spring 10, on being released by the eccentric 9, the reversing lever together with the pusher 3 will be subjected to the action of the corresponding spring 34, so that the device is brought back to the position of rest, Figs. 1 and 2.

In Figs. 1 to 9 I have represented the improved pusher device in combination with a special tension device for the ends of the threads to be presently joined by twisting. As the ends of the threads of the two warps are held in a clamp, it is of the greatest importance to effect a complete separation of the ends of such threads as are to be joined together by twisting from the unfinished lease. Besides the pushers, use has among others been made for this purpose of separators moved to and fro along the threads in the lease. A complete severing of the ends of the threads by the separators was however not possible by such means, the chief cause of this being that the warps were put in tension as a whole. Under these circumstances the single threads could never obtain the same tension, some of them being too tight and others remaining too slack. Moreover, in consequence of the work of the pushers, the threads to be presently united always become slack. This inequality in the tension of the threads gave rise to uncertainties and irregularities in the work of the device. If the ends of the threads were too slack they were not seized by the grippers and carriers or, having been seized, were thrown off again.

According to my said invention I provide that besides stretching the warps as a whole, the ends of the threads presently to be united by twisting shall singly be put in tension by a special tension device only during the operation of the pushers until the ends of the threads to be united have been removed. In this case the general tension of the threads may be slight. Owing to the special tension the ends of the threads to be joined remain stretched during the displacement of the unfinished lease; they become completely separated from the unfinished lease without the employment of separators moved along the same, and, thus separated, can be seized with certainty at a sufficient tension by the gripper hooks taking them back, and conveyed to the carrier tools by which they are transferred to the twisting device. This special tension device has pressing rolls 13 and 14 arranged on both sides of the thread clamp 15 and adapted to be lowered upon the warp threads between the clamp and further supports 16, 17 for the warps on both sides of the said clamp 15.

The pressing rolls 13, 14 are preferably made of elastic material, such as rubber or the like, and are pivoted to bell-crank levers 18, 19, which are adapted to swing about pins 20, 21 of a carrier or support 22 arranged to move vertically up and down. By means of a spring 23 the bell-crank levers 18, 19 are pushed asunder at the ends carrying the pressing rolls 13, 14, while a spring 24 forces the support 22, or the guide rod 25 of the same, against an eccentric 26 which has positive motion communicated to it.

Through the intervention of the eccentric 26 the support 22 with the pressing rolls 13, 14 is moved against the warp threads during the work of the pushers 2, 3, Figs. 3, 4, 5, 7 and 8, the pressing rolls 13, 14, in the constructional form shown, moving upon the sides of the supports 16, 17 which are turned towards the clamp 15, so that the threads will be drawn chiefly from the lease, and as little as possible from the clamp during the stretching. In order to accomplish this as far as practicable the supports 16, 17 are made in the form of shafts to which a turning movement is imparted in such a direction that they will exert a pulling action from the lease upon the warp threads (see arrows shown.)

By the special tension device the few ends of the threads, which are presently to be joined by twisting and which are lying within its reach, are stretched so much that in the displacement of the unfinished lease by the pushers 2, 3, Figs. 4, 5 and 8 the ends of the threads not seized at the moment by the pushers and which are to be separated for the removal and the twisting, will continue to lie bare and stretched, so that the carrier hooks, gripper hooks and other means for removing the ends of the threads to be joined from the unfinished lease and for conveying them to the twisting tool can pass freely behind them.

What I claim as my invention, and desire to secure by Letters Patent, is—

1. In a device of the character described, lease rods between which the ends of the threads form leases, and pairs of pushers adapted to be pushed into the lease in proximity to the lease rods and then to be moved towards one another and towards the middle of the lease during the displacement, substantially as and for the purpose herein set forth.

2. In a device of the character described, lease rods between which the ends of the threads form leases, pairs of vertical spindles near the middle of the leases, horizontal arms fixed to these spindles, pushers on the free ends of the said arms and means for operating the pushers, substantially as and for the purpose herein set forth.

3. In a device of the character described, lease rods between which the ends of the threads form leases, pairs of vertical spindles near the middle of the leases, horizontal arms fixed to these spindles, pushers on the free ends of the said arms, and slides adapted to be moved vertically up and down and in which the said vertical spindles are arranged in pairs and adapted to turn, substantially as and for the purpose herein set forth.

4. In a device of the character described, lease rods between which the ends of the threads form leases, pairs of vertical spindles near the middle of the leases, horizontal arms fixed to these spindles, pushers on the free ends of the said arms, slides adapted to be moved vertically up and down and in which the said vertical spindles are arranged in pairs, and adapted to turn, spur wheels of equal size adapted to engage with each other and secured upon the spindles of each pair, means for preventing the turning movement of the spindles with the pusher arms beyond the position of the arms parallel to the warp threads, means for continually turning the spindles with the pusher arms to the position of the arms parallel to the warp threads, means for moving the slide up and down, and means for turning the pusher arms to the position perpendicular to the warp threads, substantially as and for the purpose herein set forth.

5. In a device of the character described, lease rods between which the ends of the threads form leases, pairs of vertical spindles near the middle of the leases, horizontal arms fixed to these spindles, pushers on the free ends of the said arms, slides adapted to be moved vertically up and down and in which the said vertical spindles are arranged in pairs and adapted to turn, spur wheels of equal size adapted to engage with each other and secured upon the spindles of each pair, means for preventing the turning movement of the spindles with the pusher arms beyond the position of the arms parallel to the warp-threads, an arm on one of the spindles of each pair, a spring arranged to act upon the arm and to force the spindles so as to move the pusher arms parallel to the warp threads, means for limiting this turning movement of the spindles of the pusher arms, means for turning the spindles with the pusher arms in opposition to the action of the spring, a guide for each slide, and means for the upward and downward movement of the slide, substantially as and for the purpose herein set forth.

6. In a device of the character described, lease rods between which the ends of the threads form leases, pairs of vertical spindles near the middle of the leases, horizontal arms fixed to the spindles, pushers on the free ends of the said arms, slides adapted to be moved up and down and in which the said vertical spindles are arranged in pairs and adapted to turn, spur wheels of equal size adapted to engage with each other and secured upon the spindles of each pair, means for preventing the turning movement of the spindles with the pusher arms beyond the position of the arms parallel to the warp threads, an arm on one of the spindles of each pair, a spring arranged to act upon the arm and to force the spindles so as to move the pusher arms parallel to the warp threads, means for limiting this turning movement of the spindles of the pusher arms, means for turning the spindles with the pusher arms in opposition to the action of the spring, a guide for each slide, a shaft held in the guide for the slide and arranged vertically to the spindles, a cam placed upon this shaft and adapted to act upon the slide and means tending to continually raise the slide, substantially as and for the purpose herein set forth.

7. In a device of the character described, lease rods between which the ends of the threads form leases, pairs of vertical spindles near the middle of the leases, horizontal arms fixed to the spindles, pushers on the free ends of the said arms, slides adapted to be moved up and down and in which the said vertical spindles are arranged in pairs and adapted to turn, spur wheels of equal size adapted to engage with each other and secured upon the spindles of each pair, means for preventing the turning movement of the spindles with the pusher arms beyond the position of the arms parallel to the warp threads, an arm on one of the spindles of each pair, a spring arranged to act upon the arm and to force the spindles so as to move the pusher arms parallel to the warp threads, means for limiting this turning movement of the spindles of the pusher arms, means for turning the spindles with the pusher arms in opposition to the action of the spring, a guide for each slide, a shaft held in the guide for the slide and arranged vertically to the spindles, a cam placed upon this shaft and adapted to act upon the slide, and a spring having one of its ends fixed to the slide and the other end to the said guide, substantially as and for the purpose herein set forth.

8. In a device of the character described, lease rods between which the ends of the threads form leases, pairs of vertical spindles near the middle of the leases, horizontal arms fixed to these spindles, pushers on the free ends of the said arms, slides adapted to be moved vertically up and down and in which the said vertical spindles are arranged in pairs and adapted to turn, spur wheels of equal size adapted to engage with each other and secured upon the spindles of each pair, means for preventing the turning movement of the spindles with the pusher arms beyond the position of the arms parallel to the warp threads, an arm on one of the spindles of each pair, a spring arranged to act upon the arm and to force the spindles so as to move the pusher arms parallel to the warp threads, means for limiting the turning movement of the spindles of the pusher arms, a guide for the slide, a shaft held in this guide and placed vertical to the spindles of the pusher arms, a cam for the downward movement of the slide upon the shaft, means tending to continually raise the slide, a radial arm upon one of the spindles of the pair held in the slide and a tappet on the front of the cam, substantially as and for the purpose herein set forth.

9. In a device of the character described, lease rods between which the ends of the threads form leases, pairs of vertical spindles near the middle of the leases, horizontal arms fixed to these spindles, a slide for each pair of spindles held therein, a guide for each slide, means for the upward and downward movement of the slide, means for turning the spindles of the pairs in opposite directions, means for limiting the turning movement of the arms on the spindles to the position parallel to the warp threads, longitudinal slits in the spindles and arms, U-shaped bars having shanks of unequal length and adapted to be moved up and down in the slits, the short arms of the said bars forming pushers, and the long arms of the same being guided in the slits of the spindles, means for guiding the bars in the said slits of the spindles, and means for the upward and downward movement of the bars, substantially as and for the purpose herein set forth.

10. In a device of the character described, lease rods between which the ends of the threads form leases, pairs of vertical spindles near the middle of the leases, horizontal arms fixed to these spindles, a slide for each pair of spindles held therein, a guide for each slide, means for the upward and downward movement of the slide, means for turning the spindles of the pairs in opposite directions, means for limiting the turning movement of the arms on the spindles to the position parallel to the warp threads, longitudinal slits in the spindles and arms, U-shaped bars having shanks of unequal length and adapted to be moved up and down in the slits, the short arms of the said bars forming pushers, and the long arms of the same being guided in the slits of the spindles, a guide ring provided on the long arm of the bar and embracing the spindle, a vertical slit in the short shank of the bars, a pin in the pusher arm passing through the latter slit, and means for the upward and downward movement of the bars, substantially as and for the purpose herein set forth.

11. In a device of the character described, lease rods between which the ends of the threads form leases, pairs of vertical spindles near the middle of the leases, horizontal arms fixed to these spindles, a slide for each pair of spindles held therein, a guide for each slide, means for the upward and downward movement of the slide, means for turning the spindles of the pairs in opposite directions, means for limiting the turning movement of the arms on the spindles to the position parallel to the warp threads, longitudinal slits in the spindles and arms, U-shaped bars having shanks of unequal length and adapted to be moved up and down in the slits, the short arms of the said bars forming pushers, and the long arms of the same being guided in the slits of the spindles, a guide ring provided on the upper end of the long shank of the bar and embracing the spindle, a collar at the lower end of the spindle, a helical spring on the spindle between the guide ring and collar, and means for the alternate downward movement of the bars, substantially as and for the purpose herein set forth.

12. In a device of the character described, lease rods between which the ends of the threads form leases, pairs of vertical spindles near the middle of the leases, horizontal arms fixed to these spindles, a slide for each pair of spindles held therein, a guide for each slide, means for the upward and downward movement of the slide, means for turning the spindles of the pairs in opposite directions, means for limiting the turning movement of the arms on the spindles to the position parallel to the warp threads, longitudinal slits in the spindles and arms, U-shaped bars having shanks of unequal length and adapted to be moved up and down in the slits, the short arms of the said bars forming pushers, and the long arms of the same being guided in the slits of the spindles, a guide ring provided on the upper end of the long shank of the bar and embracing the spindle, a collar at the lower end of the spindle, a helical spring on the spindle between the guide ring and collar, a T-shaped reversing lever on the slide, the horizontal arms of the said lever pressing upon the bars, and reversible guide faces held against displacement on the guide of the slide and acting upon the vertical arm of the reversing lever, substantially as and for the purpose herein set forth.

13. In a device of the character described, lease rods between which the ends of the threads form leases, pairs of vertical spindles near the middle of the leases, horizontal arms fixed to these spindles, a slide for each pair of spindles held therein, a guide for each slide, means for the upward and downward movement of the slide, means for turning the spindles of the pairs in opposite directions, means for limiting the turning movement of the arms on the spindles to the position parallel to the warp threads, longitudinal slits in the spindles and arms, U-shaped bars having shanks of unequal length and adapted to be moved up and down in the slits, the short arms of said bars forming pushers, and the long arms of the same being guided in the slits of the spindles, a guide ring provided on the upper end of the long shank of the bar and embracing the spindle, a collar at the lower end of the spindle, a helical spring on the spindle between the guide ring and collar, a T-shaped reversing lever, the horizontal arms of which press upon the bars, a guide for the slide, a triangular switch acting upon the third arm of the three-armed reversing lever, and pivoted to the guide of the slide, and means for moving the switch through one-sixth of a turn in each upward and downward movement of the slide, substantially as and for the purpose herein set forth.

14. In a device of the character described, lease rods between which the ends of the threads form leases, pairs of vertical spindles near the middle of the leases, horizontal arms fixed to these spindles, a slide for each pair of spindles held therein, a guide for each slide, means for the upward and downward movement of the slide, means for turning the spindles of the pairs in opposite directions, means for limiting the turning movement of the arms on the spindles to the position parallel to the warp threads, longitudinal slits in the spindles and arms, U-shaped bars having shanks of unequal length and adapted to be moved up and down in the slits, the short arms of the said bars forming pushers, and the long arms of the same being guided in the slits of the spindles, a guide ring provided on the upper end of the long shank of the bar and embracing the spindle, a collar at the lower end of the spindle, a helical spring on the spindle between the guide ring and collar, a T-shaped reversing lever, the horizontal arms of which press upon the bars, a guide for the slide, a triangular switch adapted to act upon the third arm of the reversing lever, and pivoted on the guide of the slide, a ratchet wheel having six teeth and connected to the switch so as to turn therewith, and a pawl on the slide engaging with the ratchet wheel and turning the same one tooth in the downward movement of the slide, substantially as and for the purpose herein set forth.

15. In a device of the character described, means for clamping the ends of the threads of both warps, pairs of lease rods on both sides of the clamping means, supports held against displacement below the ends of the threads between the clamping means and the pairs of lease rods, pressers arranged above the ends of the warp threads and adapted to move up and down against the supports, means for the upward and downward movement of the pressers, and means for forcing the pressers against the said supports, substantially as and for the purpose herein set forth.

16. In a device of the character described, means for clamping the ends of the threads of both warps, pairs of lease rods on both sides of the clamping means, shafts held against displacement below the ends of the threads between the clamping means and the pairs of lease rods, pressers arranged above the ends of the warp threads and adapted to move up and down against the said shafts, means for the upward and downward movement of the pressers, and means for forcing the pressers against the said shafts, substantially as and for the purpose herein set forth.

17. In a device of the character described, means for clamping the ends of the threads of both warps, pairs of lease rods on both sides of the clamping means, shafts held against displacement below the ends of the threads between the clamping means and the pairs of lease rods, pressing rolls arranged above the ends of the warp threads and adapted to be turned and to be moved up and down against the said shafts, means for the upward and downward movement of the pressing rolls, and means for forcing the pressing rolls against the said shafts, substantially as and for the purpose herein set forth.

18. In a device of the character described, means for clamping the ends of the threads of both warps, pairs of lease rods on both sides of the clamping means, shafts held against displacement below the ends of the threads between the clamping means and the pairs of lease rods, pressing rolls arranged above the ends of the warp threads and adapted to be turned and to be moved up and down against the said shafts, bell-crank levers the lower arms of which carry the pressing rolls, a spring for connecting the upper arms of the bell-crank levers, a support adapted to be moved up and down and having the bell-crank levers pivoted thereto, a guide for the support and means for the upward and downward movement of such support, substantially as and for the purpose herein set forth.

19. In a device of the character described, means for clamping the ends of the threads of both warps, pairs of lease rods arranged on both sides of the clamping means and between which the ends of the threads form leases, pairs of pushers adapted to be pushed into the lease in proximity to the lease rods and then to be moved towards the middle of the lease during the displacement, supports held against displacement below the ends of the threads between the clamping means and the pairs of lease rods, pressers arranged above the ends of the warp threads and adapted to move up and down against the supports, means for the upward and downward movement of the pressers, and means for forcing the pressers against the said supports, substantially as and for the purpose herein set forth.

20. In a device of the character described, means for clamping the ends of the threads of both warps, pairs of lease rods arranged on both sides of the clamping means and between which the ends of the threads form leases, pairs of pushers adapted to be pushed into the lease in proximity to the lease rods and then to be moved towards the middle of the lease during the displacement, shafts held against displacement below the ends of the threads between the clamping means and the pairs of lease rods, pressers arranged above the ends of the warp threads and adapted to move up and down against the said shafts, means for the upward and downward movement of the pressers, and means for forcing the pressers against the said shafts, substantially as and for the purpose herein set forth.

21. In a device of the character described, means for clamping the ends of the threads of both warps, pairs of lease rods arranged on both sides of the clamping means and between which the ends of the threads form leases, pairs of pushers adapted to be pushed into the lease in proximity to the lease rods and then to be moved towards the middle of the lease during the displacement, shafts held against displacement below the ends of the threads between the clamping means and the pairs of lease rods, pressing rolls arranged above the ends of the warp threads and adapted to be turned and to be moved up and down against the said shafts, means for the upward and downward movement of the pressing rolls, and means for forcing the pressing rolls against the said shafts, substantially as and for the purpose herein set forth.

22. In a device of the character described, means for clamping the ends of the threads of both warps, pairs of lease rods arranged on both sides of the clamping means and between which the ends of the threads form leases, pairs of pushers adapted to be pushed into the lease in proximity to the lease rods and then to be moved towards the middle of the lease during the displacement, shafts held against displacement below the ends of the threads between the clamping means and the pairs of lease rods, pressing rolls arranged above the ends of the warp threads and adapted to be turned and to be moved up and down against the said shafts, bell-crank levers the lower arms of which carry the pressing rolls, a spring for connecting the upper arms of the bell-crank levers, a support adapted to be moved up and down and having the bell-crank levers pivoted thereto, a guide for the support and means for the upward and downward movement of such support, substantially as and for the purpose herein set forth.

23. In a device of the character described, means for clamping the ends of the threads of both warps, pairs of lease rods arranged on both sides of the clamping means and between which the ends of the threads form leases, pairs of vertical spindles near the middle of the leases, horizontal arms fixed to these spindles, pushers on the free ends of the said arms, supports held against displacement below the ends of the threads between the clamping means and the pairs of lease rods, pressers arranged above the ends of the warp threads and adapted to move up and down against the supports, means for the upward and downward movement of the pressers, and means for forcing the pressers against the said supports, substantially as and for the purpose herein set forth.

24. In a device of the character described, means for clamping the ends of the threads of both warps, pairs of lease rods arranged on both sides of the clamping means and between which the ends of the threads form leases, pairs of vertical spindles near the middle of the leases, horizontal arms fixed to these spindles, pushers on the free ends of the said arms, shafts held against displacement below the ends of the threads between the clamping means and the pairs of lease rods, pressers arranged above the ends of the warp threads and adapted to move up and down against the said shafts, means for the upward and downward movement of the pressers, and means for forcing the pressers against the said shafts, substantially as and for the purpose herein set forth.

25. In a device of the character described, means for clamping the ends of the threads of both warps, pairs of lease rods arranged on both sides of the clamping means and between which the ends of the threads form leases, pairs of vertical spindles near the middle of the leases, horizontal arms fixed to these spindles, pushers on the free ends of the said arms, shafts held against displacement below the ends of the threads between the clamping means and the pairs of lease rods, pressing rolls arranged above the ends of the warp threads and adapted to be turned and to be moved up and down against the said shafts, means for the upward and downward movement of the pressing rolls, and means for forcing the pressing rolls against the said shafts, substantially as and for the purpose herein set forth.

26. In a device of the character described, means for clamping the ends of the threads of both warps, pairs of lease rods arranged on both sides of the clamping means and between which the ends of the threads form leases, pairs of vertical spindles near the middle of the leases, horizontal arms fixed to these spindles, pushers on the free ends of the said arms, shafts held against displacement below the ends of the threads between the clamping means and the pairs of lease rods, pressing rolls arranged above the ends of the warp threads and adapted to be turned and to be moved up and down against the said shafts, bell-crank levers the lower arms of which carry the pressing rolls, a spring for connecting the upper arms of the bell-crank levers, a support adapted to be moved up and down and having the bell-crank levers pivoted thereto, a guide for the support, and means for the upward and downward movement of such support, substantially as and for the purpose herein set forth.

27. In a device of the character described, lease rods between which the ends of the threads form leases, pairs of vertical spindles near the middle of the leases, horizontal arms fixed to these spindles, a slide for each pair of spindles held therein, a guide for each slide, means for the upward and downward movement of the slide, means for turning the spindles of the pairs in opposite directions, means for limiting the turning movement of the arms on the spindles to the position parallel to the warp threads, longitudinal slits in the spindles and arms, U-shaped bars having shanks of unequal length and adapted to be moved up and down in the slits, the short arms of the said bars forming pushers, and the long arms of the same being guided in the slits of the spindles, means for guiding the bars in the said slits of the spindles, means for the upward and downward movement of the bars, means for clamping the ends of the threads of both warps, arranged between the said pairs of lease rods, supports held against displacement below the ends of the threads between the clamping means and the pairs of lease rods, pressers arranged above the ends of the warp threads and adapted to move up and down against the supports, means for the upward and downward movement of the pressers, and means for forcing the pressers against the said supports, substantially as and for the purpose herein set forth.

28. In a device of the character described, lease rods between which the ends of the threads form leases, pairs of vertical spindles near the middle of the leases, horizontal arms fixed to these spindles, a slide for each pair of spindles held therein, a guide for each slide, means for the upward and downward movement of the slide, means for turning the spindles of the pairs in opposite directions, means for limiting the turning movement of the arms on the spindles to the position parallel to the warp threads, longitudinal slits in the spindles and arms, U-shaped bars having shanks of unequal length and adapted to be moved up and down in the slits, the short arms of the said bars forming pushers, and the long arms of the same being guided in the slits of the spindles, means for guiding the bars in the said slits of the spindles, means for the upward and downward movement of the bars means for clamping the ends of the threads of both warps arranged between the said pairs of lease rods, shafts held against displacement below the ends of the threads between the clamping means and the pairs of lease rods, pressers arranged above the ends of the warp threads and adapted to move up and down against the said shafts, means for the upward and downward movement of the pressers, and means for forcing the pressers against the said shafts, substantially as and for the purpose herein set forth.

29. In a device of the character described, lease rods between which the ends of the threads form leases, pairs of vertical spindles near the middle of the leases, horizontal arms fixed to these spindles, a slide for each pair of spindles held therein, a guide for each slide, means for the upward and downward movement of the slide, means for turning the spindles of the pairs in opposite directions, means for limiting the turning movement of the arms on the spindles to the position parallel to the warp threads, longitudinal slits in the spindles and arms, U-shaped bars having shanks of unequal length and adapted to be moved up and down in the slits, the short arms of the said bars forming pushers, and the long arms of the same being guided in the slits of the spindles, means for guiding the bars in the said slits of the spindles, means for the upward and downward movement of the bars, means for clamping the ends of the threads of both warps, arranged between the said pairs of lease rods, shafts held against displacement below the ends of the threads between the clamping means and the pairs of lease rods, pressing rolls arranged above the ends of the warp threads and adapted to be turned and to be moved up and down against the said shafts, means for the upward and downward movement of the pressing rolls, and means for forcing the pressing rolls against the said shafts, substantially as and for the purpose herein set forth.

30. In a device of the character described, lease rods between which the ends of the threads form leases, pairs of vertical spindles near the middle of the leases, horizontal arms fixed to these spindles, a slide for each pair of spindles held therein, a guide for each slide, means for the upward and downward movement of the slide, means for turning the spindles of the pairs in opposite directions, means for limiting the turning movement of the arms on the spindles to the position parallel to the warp threads, longitudinal slits in the spindles and arms, U-shaped bars having shanks of unequal length and adapted to be moved up and down in the slits, the short arms of the said bars forming pushers, and the long arms of the same being guided in the slits of the spindles, means for guiding the bars in the said slits of the spindles, means for the upward and downward movement of the bars, means for clamping the ends of the threads of both warps arranged between the said pairs of lease rods, shafts held against displacement below the ends of the threads between the clamping means and the pairs of lease rods, pressing rolls arranged above the ends of the warp threads and adapted to be turned and to be moved up and down against the said shafts, bell-crank levers the lower arms of which carry the pressing rolls, a spring for connecting the upper arms of the bell-crank levers, a support adapted to be moved up and down and having the bell-crank levers pivoted thereto, a guide for the support and means for the upward and downward movement of such support, substantially as and for the purpose set forth.

In testimony whereof I have signed my name to this specification in the presence of two subscribing witnesses.

GUSTAV HILLER.

Witnesses:
JACOB FREUND,
HERMANN KRANSC